(12) United States Patent
Osada

(10) Patent No.: US 9,172,840 B2
(45) Date of Patent: Oct. 27, 2015

(54) IMAGE PROCESSING APPARATUS AND METHOD FOR CONTROLLING IMAGE PROCESSING APPARATUS

(75) Inventor: Mamoru Osada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 13/473,343

(22) Filed: May 16, 2012

(65) Prior Publication Data

US 2012/0297242 A1    Nov. 22, 2012

(30) Foreign Application Priority Data

May 20, 2011    (JP) .................................. 2011-113825

(51) Int. Cl.
   *G06F 11/00*    (2006.01)
   *H04N 1/32*    (2006.01)
   *G06F 11/07*    (2006.01)

(52) U.S. Cl.
   CPC ........ *H04N 1/32635* (2013.01); *G06F 11/0733* (2013.01); *G06F 11/0793* (2013.01)

(58) Field of Classification Search
   CPC ............. G06F 11/1471; G06F 11/1438; G06F 11/1469; G06F 11/10; G06F 11/1076; G06F 11/0751; G06F 11/079; G06F 11/0793
   USPC ............................................ 714/15, 6.11, 49
   See application file for complete search history.

(56) References Cited

U.S. PATENT DOCUMENTS

| 6,088,778 | A | 7/2000 | Ruff et al. |
|---|---|---|---|
| 2004/0145766 | A1 | 7/2004 | Sugishita et al. |
| 2006/0080330 | A1 | 4/2006 | Sugino |
| 2008/0316522 | A1 | 12/2008 | Yokoyama et al. |
| 2009/0002733 | A1 | 1/2009 | Kakigi |
| 2010/0166448 | A1* | 7/2010 | Mikami ........................ 399/88 |
| 2010/0245909 | A1 | 9/2010 | Yamaguchi |
| 2011/0320748 | A1* | 12/2011 | Hamaguchi ................... 711/154 |
| 2012/0062948 | A1* | 3/2012 | Nishikawa ................... 358/1.15 |
| 2014/0176975 | A1* | 6/2014 | Kobayashi et al. .......... 358/1.13 |

FOREIGN PATENT DOCUMENTS

| EP | 2400423 A1 | 12/2011 |
|---|---|---|
| JP | 2000-215008 A | 8/2000 |
| JP | 2000-215008 A | 8/2000 |
| JP | 2001-249814 A | 9/2001 |
| JP | 2008-148226 A | 6/2008 |
| JP | 2010-156862 A | 7/2010 |
| JP | 2011-054146 A | 3/2011 |

* cited by examiner

*Primary Examiner* — Yair Leibovich
(74) *Attorney, Agent, or Firm* — Canon USA Inc. IP Division

(57) ABSTRACT

An image processing apparatus includes an image processing unit configured to perform image processing, a storage unit configured to be capable of storing an application program installed in the image processing apparatus, a first determination unit configured to determine whether the application program had ever been installed in the image processing apparatus, and a control unit configured to selectively control the image processing unit to be operable and control the image processing unit not to operate according to the determination by the first determination unit if an error has occurred in the storage unit.

13 Claims, 9 Drawing Sheets

IMAGE PROCESSING APPARATUS AND METHOD FOR CONTROLLING IMAGE PROCESSING APPARATUS

BACKGROUND OF THE INVENTION

1. Field of the Invention

The present invention relates to an image processing apparatus capable of executing an installed application program.

2. Description of the Related Art

Japanese Patent Application Laid-Open No. 2010-156862 discusses a digital multifunction peripheral including a degeneration unit configured to invalidate, when some of its functions cannot be used due to a failure or the like, the functions, to operate the other functions that can be used. Japanese Patent Application Laid-Open No. 2001-249814 discusses constructing another execution environment directed toward a built-in system, e.g., an execution environment such as Java (registered trademark) on a real-time operating system (OS) in an image processing apparatus or the like, and downloading an application program from outside and executing the downloaded application program.

The application programs to be downloaded and executed, as discussed in Japanese Patent Application Laid-Open No. 2001-249814, include one having a function relating to security such as user authentication and one having an account function for counting use statuses of the image processing apparatus.

When a secondary storage function (e.g., a hard disk drive) in the image processing apparatus cannot be used, the downtime of the image processing apparatus is lengthened in a configuration in which an error screen is unconditionally displayed to call a service engineer, i.e., a configuration in which a user cannot use the image processing apparatus.

On the other hand, when the image processing apparatus continues to be used by invalidating the secondary storage function, as discussed in Japanese Patent Application Laid-Open No. 2010-156862, functions of the downloaded application program cannot be used. If the application program provides a function relating to security such as a user authentication function, for example, it is not desirable for security reasons that the image processing apparatus can be used in a situation where the function is not validated.

If the application program provides the account function for counting use statuses of the image processing apparatus, for example, the image processing apparatus can be used in a situation where the function is not validated. Thus, the use statuses of the image processing apparatus cannot be correctly counted. When a function required to manage the image processing apparatus cannot be provided by performing a degeneration operation, therefore, the image processing apparatus may not correctly operate.

SUMMARY OF THE INVENTION

The present invention is directed to an image processing apparatus that can avoid incorrectly operating by invalidating a specific function.

According to an aspect of the present invention, an image processing apparatus includes an image processing unit configured to perform image processing, a storage unit configured to be capable of storing an application program installed in the image processing apparatus, a first determination unit configured to determine whether the application program had ever been installed in the image processing apparatus, and a control unit configured to selectively control the image processing unit to be operable and control the image processing unit not to operate according to the determination by the first determination unit if an error has occurred in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
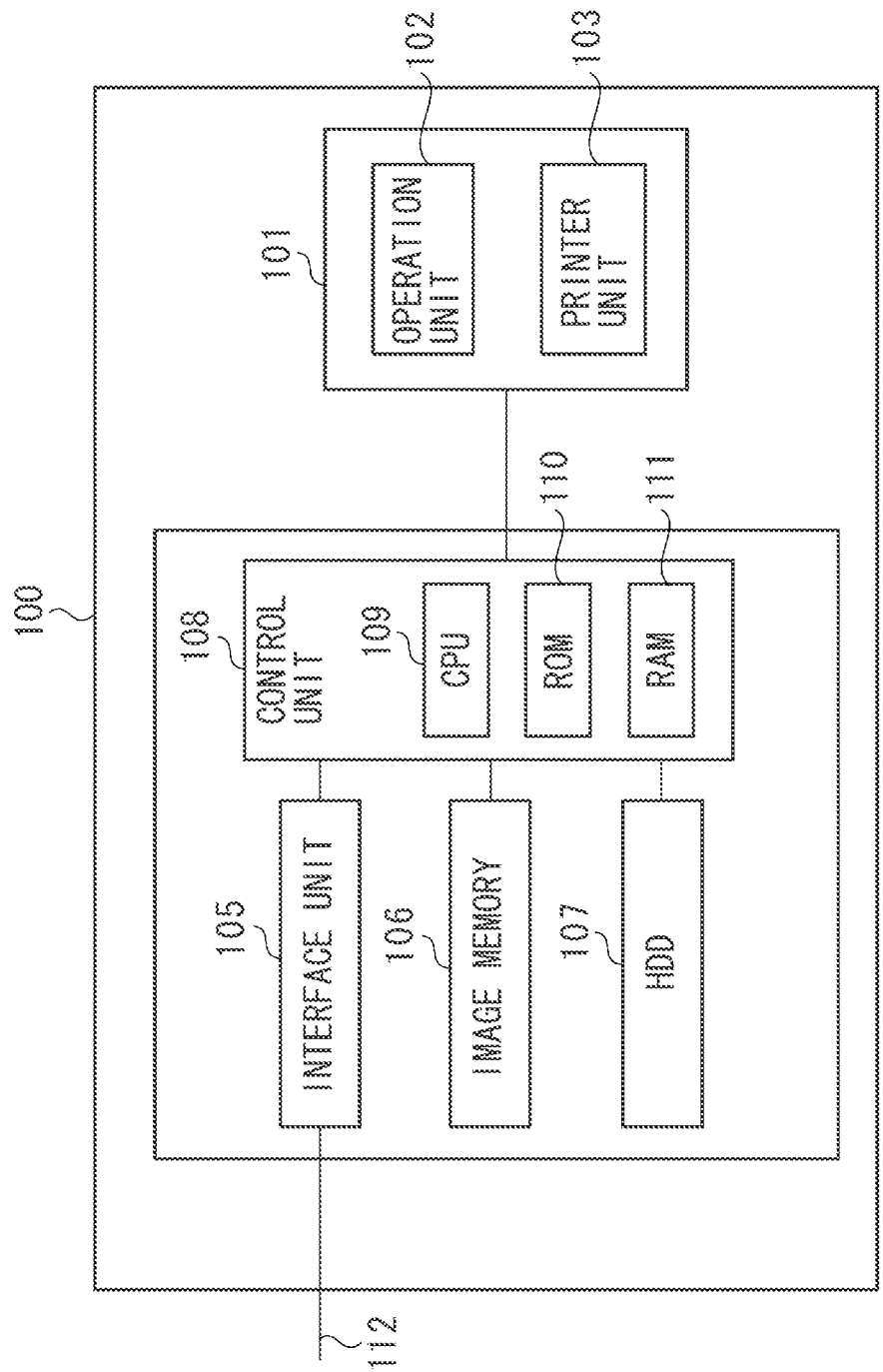
FIG. 1 is a block diagram illustrating an example of a device configuration of a printing apparatus according to a first exemplary embodiment of the present invention.

FIG. 1 is a block diagram illustrating an example of a device configuration of a printing apparatus 100 according to a first exemplary embodiment. The printing apparatus 100 is an example of an image processing apparatus. A control unit 108 including a central processing unit (CPU) 109 controls the entire operation of the printing apparatus 100. The CPU 109 reads a program stored in a read-only memory (ROM) 110 or a hard disk (HDD), and performs various types of control of the printing apparatus 100. A random access memory (RAM) 111 is used as a main memory of the CPU 109 or a temporary storage area such as a work area. In the present exemplary embodiment, the RAM 111 has a nonvolatile area (e.g., a static RAM (SRAM)/ferroelectric RAM (FRAM)). The HDD 107 stores image data and various programs. The control unit 108 is connected to a functional unit 101, to control operations of an operation unit 102 and a printer unit 103 included in the functional unit 101.

The operation unit 102 includes a liquid crystal display unit having a touch panel function and a keyboard. The printer unit 103 prints image data to be printed, which is input from the control unit 108, on a sheet. The printer unit 103 includes a sheet feeding device and a sheet discharge device.

An interface unit 105 connects the control unit 108 to a network (not illustrated), to receive image data for printing from an information processing device (not illustrated) on the network and receive screen data to be displayed in the operation unit 102. If an application program, which is described below, is installed in the printing apparatus 100, the application program is downloaded via the interface unit 105. An image to be printed, which is received from an information processing device (not illustrated), is temporarily stored in an image memory 106, and is printed in the printer unit 103 via the control unit 108.

While the printing apparatus 100 will be described as an example of an image processing apparatus according to the present exemplary embodiment, the printing apparatus 100 may be a multifunction peripheral further having a scanner function and an image transmitting function.

Figure 2:
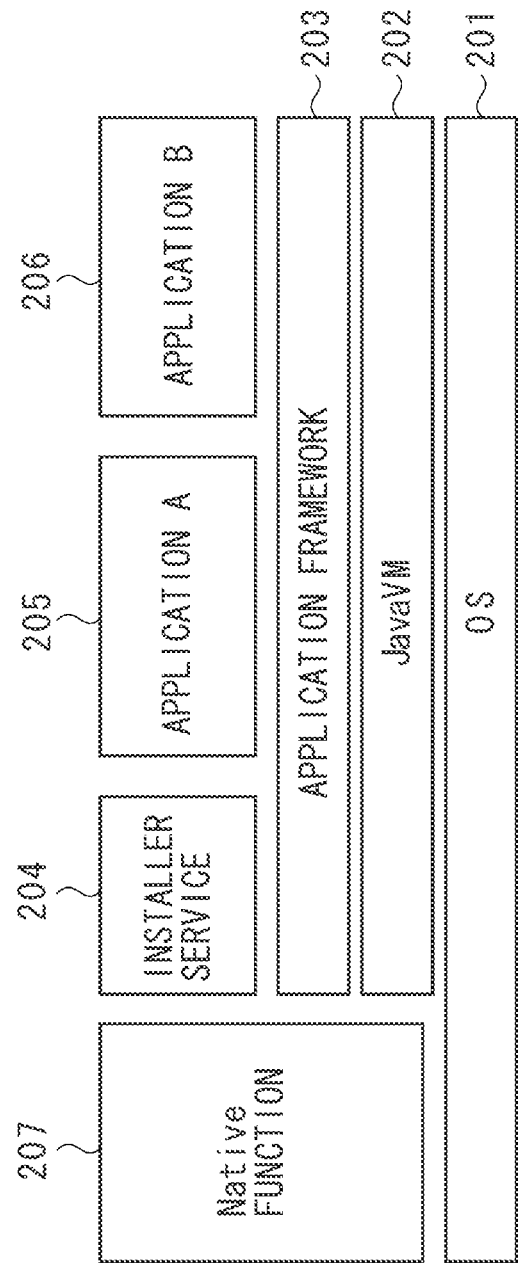
FIG. 2 illustrates an example of a software configuration of the printing apparatus.

FIG. 2 illustrates an example of a software configuration of the printing apparatus 100 according to the present exemplary embodiment. Each piece of software illustrated in FIG. 2 is stored in the ROM 110 or the HDD 107, and is executed by the CPU 109.

While an operation system (OS) layer 201 generally includes a real-time OS, it may include a general-purpose OS such as Linux (registered trademark). A Java virtual machine (VM) 202 is a virtual machine such as Java (registered trademark), and provides an execution environment of the application program. An application framework 203 provides a function of managing a life cycle of the application program. An installer service 204 performs installation processing by registering a plurality of application programs such as application programs A and B, which are described below, in the application framework 203.

The application program A 205 and the application program B 206 are installed by the installer service 204, and provide various functions on the printing apparatus 100. The application program A 205 and the application program B 206 can be downloaded from outside the printing apparatus 100 and installed.

At least one of the application program. A 205 and the application program B 206 can communicate with a user via the operation unit 102. At least one of the application program A 205 and the application program B 206 can also receive data from a personal computer (PC) on the network (not illustrated) via the interface unit 105, and print the data using the printer unit 103. The installer service 204 is accessed using a browser from an information processing device (not illustrated), to receive a predetermined application file 401 illustrated in FIG. 4, described below.

A Native function 207 provides a function incorporated in the printing apparatus 100. An example of the Native function 207 is a function of performing printing in the printer unit 103 based on print data received via the interface unit 105. In the present exemplary embodiment, the JavaVM 202, the application framework 203, the application program A 205, and the application program B 206 are stored in the HDD 107. The Native function 207 is stored in the ROM 110.

Figure 3:
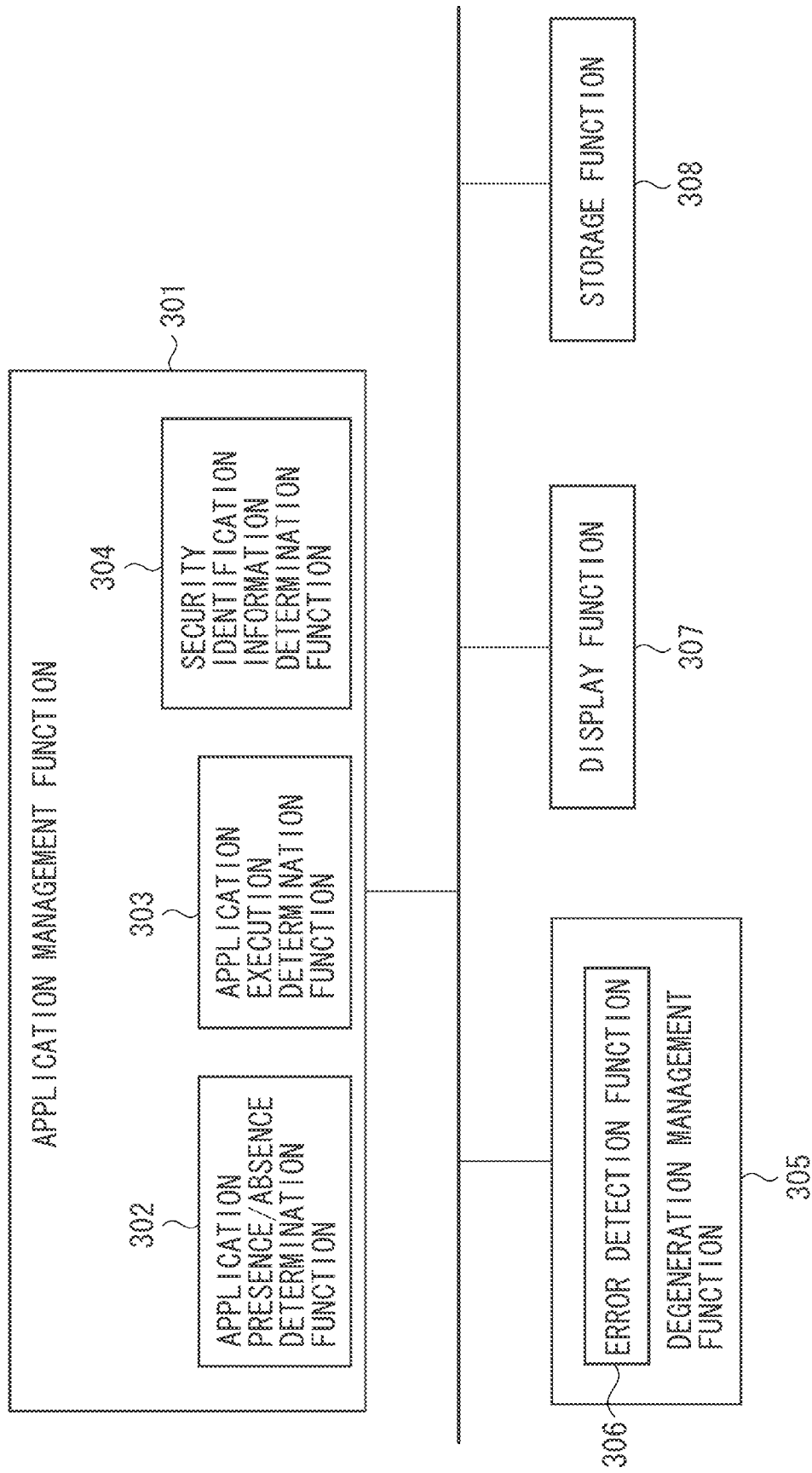
FIG. 3 illustrates an example of a functional block of the printing apparatus.

FIG. 3 illustrates an example of a functional block of the printing apparatus 100 according to the first exemplary embodiment. Each of functions illustrated in FIG. 3 is configured as software, and is provided by any one of the pieces of software illustrated in FIG. 2 or its part, or a combination of the plurality of pieces of software illustrated in FIG. 2.

An application management function 301 is included in the installer service 204. An application presence/absence determination function 302 determines the presence or absence of an application program installed via the installer service 204. In the nonvolatile area in the RAM 111, information to identify the application program installed by the installer service 204 is stored. The application presence/absence determination function 302 refers to information stored in the RAM 111 and determines that the application program had ever been installed in the image processing apparatus. Information representing the installed application program is stored in the nonvolatile area (e.g., SRAM/FRAM) of the RAM 111. The application presence/absence determination function 302 refers to the RAM 111 to determine the presence or absence of the installed application program.

The application execution determination function 303 determines whether the application program installed via the installer service 204 is being executed or whether the application program is to be executed at predetermined timing such as the start time of the printing apparatus 100. A security identification information determination function 304 refers to security identification information 403 illustrated in FIG. 4 to determine whether the application program includes the security identification information 403.

A degeneration management function 305 is included in the Native function 207. The degeneration management function 305 performs processing for continuing an operation of the printing apparatus 100 (a degeneration operation) depending on an error detected by an error detection function 306 described below by invalidating a function in which tan error has occurred. The error detection function 306 monitors states of the sheet feeding device and the sheet discharge device in the printer unit 103 and also a state of each of units included in the printing apparatus 100, such as the HDD 107 and the interface unit 105.

A display function 307 issues an instruction to display a message or the like to the liquid crystal display unit of the operation unit 102. A storage function 308 writes and reads data to and from the HDD 107 and the RAM 111.

Figure 4:
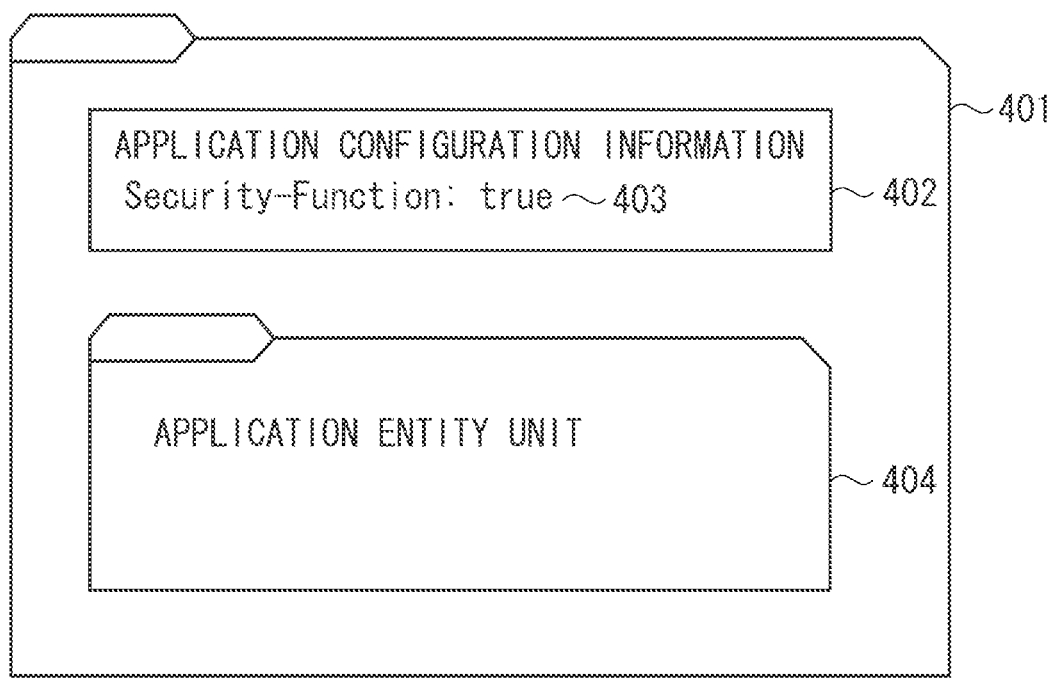
FIG. 4 illustrates an example of a structure of an application program.

FIG. 4 illustrates an example of a structure of the application program according to the present exemplary embodiment. Specifically FIG. 4 illustrates structures of the application program A 205 and the application program B 206 illustrated in FIG. 2.

An application file 401 includes application configuration information 402 and an application entity unit 404. The application configuration information 402 includes security identification information 403. The application management function 301 included in the installer service 204 extracts the security identification information 403 when the application file 401 is installed. The storage function 308 stores the extracted security identification information 403 in the HDD 107 or the RAM 111.

The application entity unit 404 is an entity itself of an application program included in the application file 401. When the application management function 301 installs the application file 401, the storage function 308 stores the application entity unit 404 in a predetermined area of the HDD 107.

The security identification information 403 indicates that the application program is related to security of the printing apparatus 100. The application program including the security identification information 403 is executed so that the security of the printing apparatus 100 is maintained. For example, an application program for authenticating a user of the printing apparatus 100, an application program for encrypting data to be stored in the HDD 107 in the printing apparatus 100, and an application program for implementing secured printing each include the security identification information 403.

An application program to provide an account function for counting use statuses of the printing apparatus 100 may includes the security identification information 403. More specifically, the security identification information 403 may be used as identification information for indicating an application program to be used to manage the printing apparatus 100.

Figure 5:
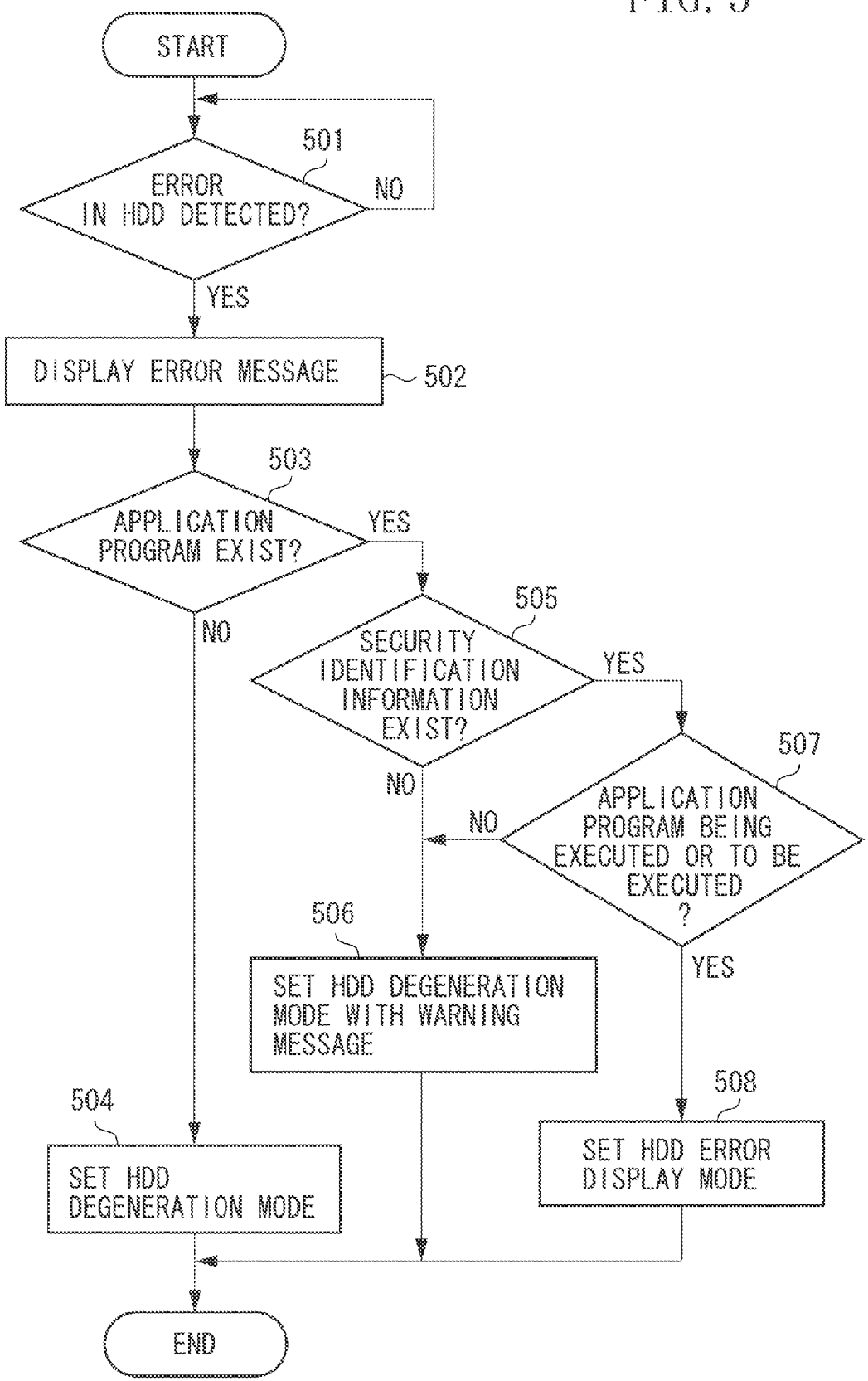
FIG. 5 is a flowchart illustrating an example of processing performed by the printing apparatus to detect an error in a hard disk (HDD).

FIG. 5 is a flowchart illustrating an example of processing performed by the printing apparatus 100 according to the first exemplary embodiment to detect an error in the HDD 107. While any one of the functions illustrated in FIG. 3 mainly executes each of steps in the flowcharts illustrated in FIGS. 5 and 6, the functional block illustrated in FIG. 3 is implemented when the CPU 109 in the printing apparatus 100 executes any one of the pieces of software illustrated in FIG. 2. Accordingly, processing illustrated in the flowchart is implemented when the CPU 109 in the printing apparatus 100 executes any one of the pieces of software illustrated in FIG. 2.

In step 501, the error detection function 306 determines whether to detect an error in the HDD 107. If the error in the HDD 107 cannot be detected (NO in step 501), the processing in step 501 is repeated. Alternatively, if the error in the HDD 107 is not detected (NO in step 501), then the printing apparatus 100 performs a normal operation. If the error in the HDD 107 is detected (YES in step 501), the processing proceeds to step 502.

In step 502, the display function 307 displays a message indicating that an error has occurred in the HDD 107 on the liquid crystal display unit of the operation unit 102. In step 503, the application presence/absence determination function 302 determines whether an application program, which has already been installed in the printing apparatus 100, exists. If the application program, which has been installed in the printing apparatus 100, does not exist (NO in step 503), the processing proceeds to step 504. If the installed application program exists (YES in step 503), the processing proceeds to step 505.

In step 504, the degeneration management function 305 sets an "HDD degeneration mode". The "HDD degeneration mode" means a parameter for the printing apparatus 100 to shift to a state where the HDD 107 is invalidated when started next time. The parameter is stored in the nonvolatile area (e.g., SRAM/FRAM) of the RAM 111.

In step 505, the security identification information determination function 304 determines whether there is an application program including the security identification information 403 among the application programs, which have been installed in the printing apparatus 100. If it is determined that the application program including the security identification information 403 does not exist (NO in step 505), the processing proceeds to step 506. If it is determined that the application program including the security identification information 403 exists (YES in step 505), the processing proceeds to step 507.

In step 506, the degeneration management function 305 sets an "HDD degeneration mode with a warning message" in the nonvolatile area (e.g., SRAM/FRAM) of the RAM 111. The "HDD degeneration mode with a warning message" will be described below.

In step 507, the application execution determination function 303 performs the following determination for the application program that is determined to include the security identification information 403. More specifically, the application execution determination function 303 determines (1) whether the application program is being executed or (2) whether the application program is to be executed at predetermined timing such as the start time of the printing apparatus 100.

If the application program that is determined to include the security identification information is determined as being executed or as the application program to be executed at the predetermined timing such as the start time of the printing apparatus 100 (YES in step 507), the processing proceeds to step 508. On the other hand, if the application program that is determined to include the security identification information 403 is determined as not being executed or as the application program not to be executed at the predetermined timing such as the start time of the printing apparatus 100 (NO in step 507), the processing proceeds to step 506.

In step 505, if it is determined that there is a plurality of application programs including security identification information 403 (YES in step 505), and if it is determined that at least one of the plurality of application programs is to be executed when the printing apparatus 100 is started (YES in step 507), the processing proceeds to step 508. On the other hand, if it is determined that none of the plurality of application programs is to be executed when the printing apparatus 100 is started (NO in step 507), the processing proceeds to step 506.

In step 508, the degeneration management function 305 sets an "HDD error display mode" in the nonvolatile area (e.g., SRAM/FRAM) of the RAM 111. Further, the degeneration management function 305 sets a parameter in the nonvolatile area (e.g., SRAM/FRAM) of the RAM 111. The parameter is used for displaying an error message indicating that an error has occurred in the HDD 107 on the liquid crystal display unit of the operation unit 102 when the printing apparatus 100 is started next time.

After the processing in steps 504, 506, and 508 are executed, the processing in the flowchart is ended. After the execution of the processing in the flowchart is ended, the printing apparatus 100 stops performing a printing operation and receiving print data, and waits while a message for prompting a user to restart the printing apparatus 100 (turn off and restore the power to the printing apparatus 100) is displayed in the operation unit 102. An error code may be displayed as the message. When the user restarts the printing apparatus 100 in such a state, the printing apparatus 100 performs processing described in a flowchart illustrated in FIG. 6.

Figure 6:
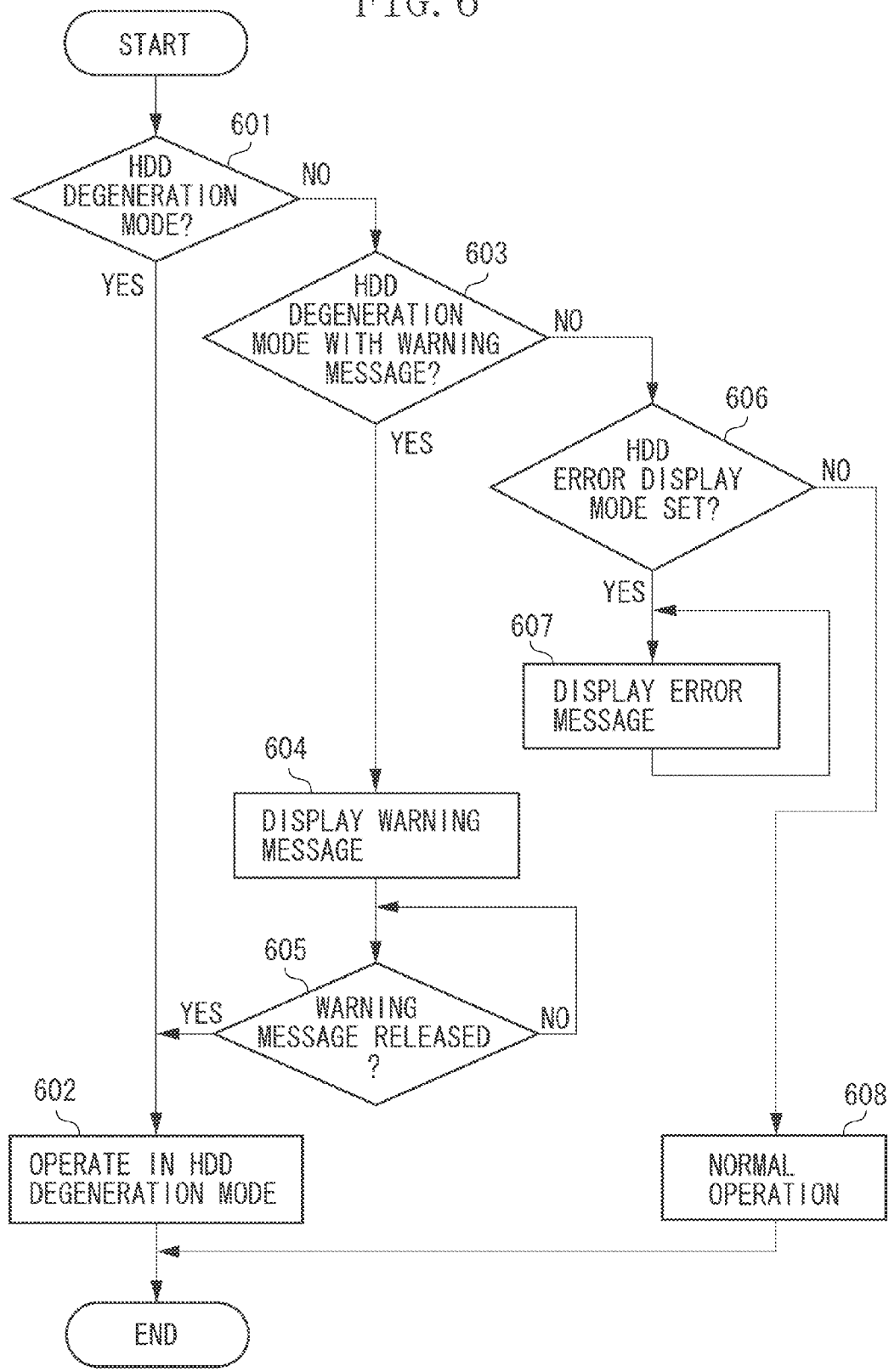
FIG. 6 is a flowchart illustrating an example of processing performed by the printing apparatus when starting up.

FIG. 6 is a flowchart illustrating an example of processing performed by the printing apparatus 100 according to the first exemplary embodiment to start. The processing in the flowchart is implemented when the CPU 109 in the printing apparatus 100 executes any one of the software pieces illustrated in FIG. 2. The execution of the processing in the flowchart is started by turning on the power to the printing apparatus 100.

In step 601, the CPU 109 refers to the nonvolatile area (e.g., SRAM/FRAM) of the RAM 111 to determine whether the "HDD degeneration mode" is set in a startup parameter. If the "HDD degeneration mode" is set (YES in step 601), the processing proceeds to step 602. Otherwise (NO in step 601), the processing proceeds to step 603.

In step 602, the printing apparatus 100 operates in the "HDD degeneration mode". In the "HDD degeneration mode", the printing apparatus 100 is started while the HDD 107 is invalidated. If the HDD 107 is invalidated, the application management function 301 cannot perform processing for activating the application program stored in the HDD 107. Accordingly, the printing apparatus 100 operates while no function is provided by the application program, and a printing function and an image processing function which are provided by the Native function 207 stored in the ROM 110 operate.

In step 603, the CPU 109 refers to the nonvolatile area (e.g., SRAM/FRAM) of the RAM 111 to determine whether the "HDD degeneration mode with a warning message" is set in the startup parameter. If the "HDD degeneration mode with a warning message" is set (YES in step 603), the processing proceeds to step 604. If the "HDD degeneration mode with a warning message" is not set (NO in step 603), the processing proceeds to step 606.

In step 604, the display function 307 display a predetermined warning message indicating that an unusable application program exists on the liquid crystal display unit of the operation unit 102.

In step 605, the CPU 109 determines whether the warning message displayed in step 604 is released by a predetermined operation performed by the user on the operation unit 102. If it is determined that the warning message is released (YES in step 605), the processing proceeds to step 602.

In step 606, the CPU 109 refers to the nonvolatile area (e.g., SRAM/FRAM) of the RAM 111, to determine whether the "HDD error display mode" is set in the startup parameter. If the "HDD error display mode" is set (YES in step 606), the processing proceeds to step 607. If the "HDD error display mode" is not set (NO in step 606), the processing proceeds to step 608.

In step 607, the display function 307 displays an error message on the liquid crystal display unit of the operation unit 102. The error message is a message for prompting the user to request a service engineer to perform predetermined restoration processing. In the "HDD error display mode", the printing apparatus 100 does not enter a normal operating state, so that the printing function or the like does not operate. Further in the "HDD error display mode", the printing apparatus 100 does not operate in the "HDD degeneration mode". To restore the printing apparatus 100 from the "HDD error display mode", the service engineer is required to perform predetermined restoration processing so that the error in the HDD 107 is resolved.

In step 608, the printing apparatus 100 starts to perform the normal operation because no parameter is set in the nonvolatile area (e.g., SRAM/FRAM) of the RAM 111 (no error has occurred in the HDD 107).

According to the flowcharts illustrated in FIGS. 5 and 6, if the specific application program including the security identification information 403 cannot be executed in steps 507, 508, 606, and 607, the printing apparatus 100 is prevented from performing the degeneration operation by invalidating the HDD 107. Thus, the printing apparatus 100 can be prevented from operating without executing the application program including the security identification information 403, i.e., the application program required to maintain the security of the printing apparatus 100. Accordingly, the security of the printing apparatus 100 can be maintained.

In step 604 illustrated in FIG. 6, the user of the printing apparatus 100 can call the service engineer to perform the predetermined restoration processing, or can continue to use the printing apparatus 100 without using the function of the application program if the user determines that user's operations are not affected. In other words, whether to operate in the "HDD degeneration mode" can thus be selectively controlled. Therefore, the printing apparatus 100 can be prevented from not correctly operating, so that convenience for the user can be improved.

If, in step 503 in the flowchart illustrated in FIG. 5, the application presence/absence determination function 302 determines that the application program, which has already been installed, exists (YES in step 503), the processing may proceed to step 508 without performing the determinations in steps 505 and 507. More specifically, if an error has occurred in the HDD 107 while an application program is installed in the printing apparatus 100 and the HDD 107 stores the application file 401, the printing apparatus 100 is set to the "HDD error display mode". In this state, the printing apparatus 100 does not enter an operable state even if the printing apparatus 100 is restarted. In this case, the printing apparatus 100 can shift to the "HDD degeneration mode" only in the case that the application program is not installed in the printing apparatus 100.

If, in step 505 in the flowchart illustrated in FIG. 5, it is determined that the application program including the security identification information 403 exists (YES in step 505), the processing may proceed to step 508 without performing the determination in step 507.

A second exemplary embodiment of the present invention will be described below with reference to the drawings.

The second exemplary embodiment includes storage area automatic restoration processing and storage area initialization processing, which is performed when a storage area cannot be restored, in addition to the first exemplary embodiment.

A device configuration of the printing apparatus 100 according to the second exemplary embodiment is similar to that illustrated in FIG. 1. A software configuration of the printing apparatus 100 is similar to that illustrated in FIG. 2. A structure of an application program to be installed in the printing apparatus 100 is similar to that illustrated in FIG. 4.

Figure 7:
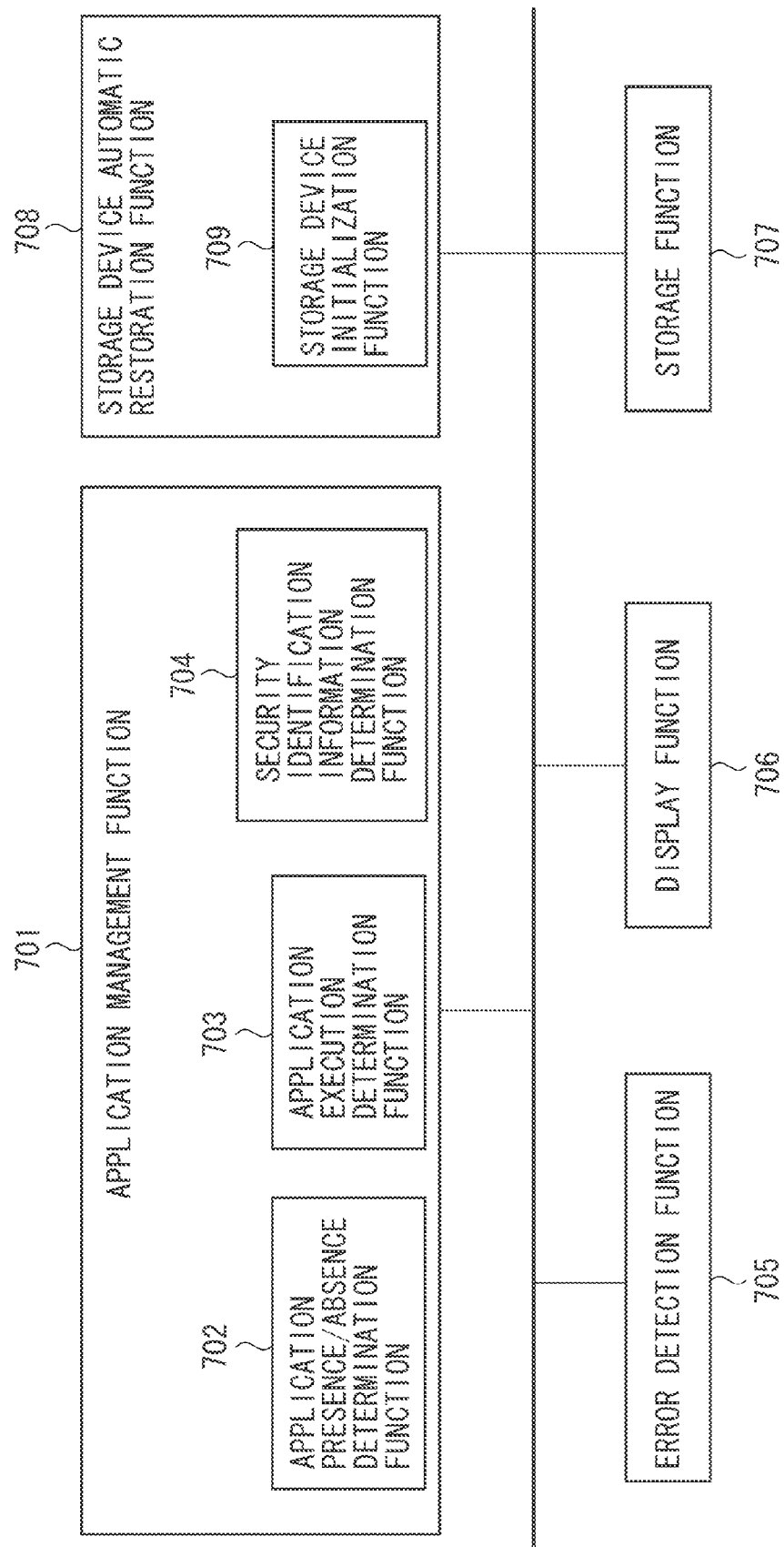
FIG. 7 illustrates a functional block of a printing apparatus according to a second exemplary embodiment of the present invention.

FIG. 7 illustrates an example of a functional block of the printing apparatus 100 according to the second exemplary embodiment. Each of functions illustrated in FIG. 7 is configured as software, and is provided by any one of the pieces of software illustrated in FIG. 2 or its part, or a combination of the plurality of pieces of software illustrated in FIG. 2.

An application management function 701 is similar to the application management function 301 illustrated in FIG. 3. An application presence/absence determination function 702, an application execution determination function 703, and a security identification information determination function 704, which are included in the application management function 701, are respectively similar to the application presence/absence determination function 302, the application execution determination function 303, and the security identification information determination function 304. Data pieces to be used when the application presence/absence determination function 702, the application execution determination function 703, and the security identification information determination function 704 respectively perform determinations are stored in a nonvolatile area (e.g., an SRAM/FRAM) of a RAM 111.

An error detection function 705 monitors states of the sheet feeding device and the sheet discharge device in the printer unit 103 and also a state of each of units included in the printing apparatus 100, such as the HDD 107 and the interface unit 105.

A display function 706 is similar to the display function 307 illustrated in FIG. 3. A storage function 707 is similar to the storage function 308 illustrated in FIG. 3. A storage device automatic restoration function 708 has a function of restoring the HDD 107. A storage device initialization function 709 included in the storage device automatic restoration function 708 has a function of initializing (formatting) the HDD 107 and restoring the HDD 107 to an initial state.

Figure 8:
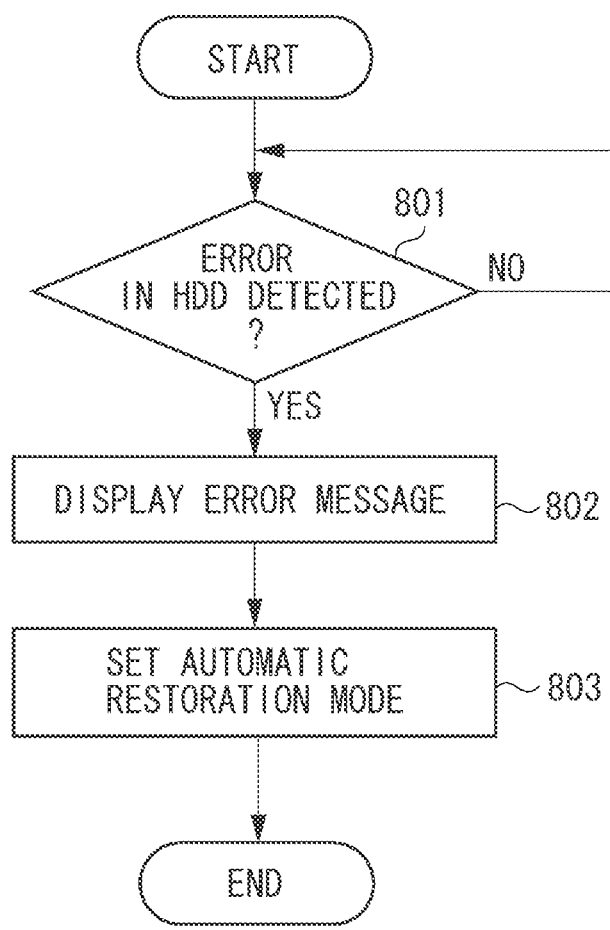
FIG. 8 is a flowchart illustrating an example of processing performed by the printing apparatus according to the second exemplary embodiment to detect an error in a HDD.

FIG. 8 is a flowchart illustrating an example of processing performed by the printing apparatus 100 according to the second exemplary embodiment to detect an error in the HDD 107. While any one of the functions illustrated in FIG. 7 mainly executes each of steps in the flowcharts illustrated in FIGS. 8 and 9, the functional block illustrated in FIG. 7 is implemented when the CPU 109 in the printing apparatus 100 executes any one of the pieces of software illustrated in FIG. 2. Accordingly, processing illustrated in the flowchart is implemented when the CPU 109 in the printing apparatus 100 executes any one of the pieces of software illustrated in FIG. 2.

In step 801, the error detection function 705 determines whether to detect an error in the HDD 107. If the error in the HDD 107 cannot be detected (NO in step 801), the processing in step 801 is repeated. In addition, if the error in the HDD 107 is not detected (NO in step 801), then the printing apparatus performs a normal operation. If the error in the HDD 107 is detected (YES in step 801), the processing proceeds to step 802.

In step 802, the display function 706 displays a message indicating that an error has occurred in the HDD 107 on a liquid crystal display unit of an operation unit 102.

In step 803, the CPU 109 sets an "automatic restoration mode" serving as a parameter for automatically restoring the HDD 107 when the printing apparatus 100 is started next time. The parameter is stored in the nonvolatile area (e.g., SRAM/FRAM) of the RAM 111. Then, the processing in the flowchart is ended.

Figure 9:
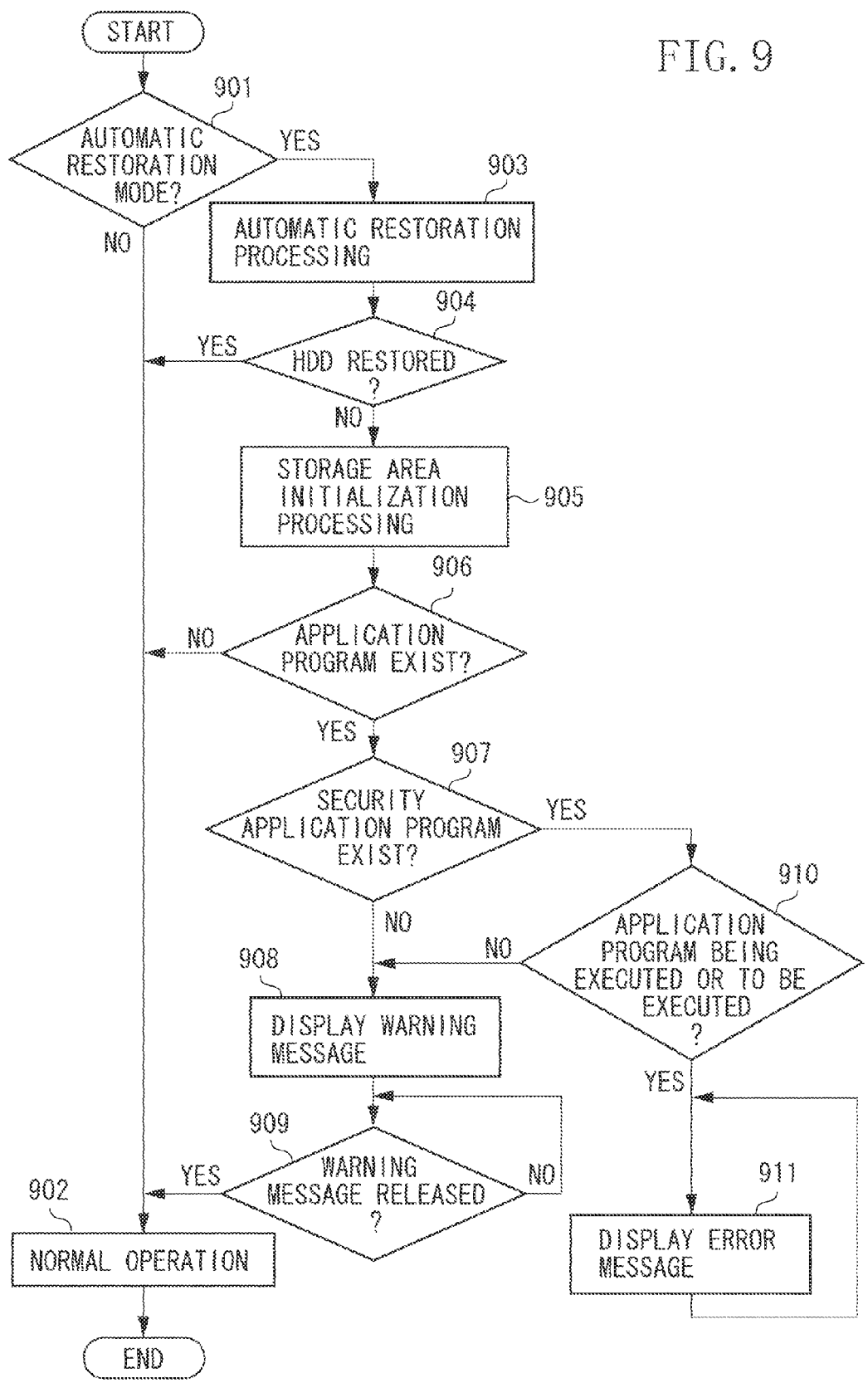
FIG. 9 is a flowchart illustrating an example of processing performed by the printing apparatus according to the second exemplary embodiment when starting up.

FIG. 9 is a flowchart illustrating an example of processing performed when the printing apparatus 100 according to the second exemplary embodiment is started. The processing illustrated in the flowchart is implemented when the CPU 109 in the printing apparatus 100 executes any one of the pieces of software illustrated in FIG. 2. The execution of the processing in the flowchart is started by turning on the power to the printing apparatus 100.

In step 901, the CPU 109 refers to the nonvolatile area (e.g., SRAM/FRAM) of the RAM 111 to determine whether an "automatic restoration mode" is set. If the "automatic restoration mode" is not set (NO in step 901), the processing proceeds to step 902. If the "automatic restoration mode" is set (YES in step 901), the processing proceeds to step 903.

In step 902, the printing apparatus 100 to perform a normal operation. The printing apparatus 100 executes original functions (a printing function and an image processing function). The printing apparatus 100 during the normal operation also performs a function provided by an application program stored in the HDD 107.

In step 903, the storage device automatic restoration function 708 automatically restores the HDD 107. The storage device automatic restoration function 708 resolves the error in the HDD 107, and performs processing for returning to a situation where the error has not occurred. Known restoration processing (e.g., check disk) is performed In step 904, the CPU 109 determines whether the HDD 107 is restored to the situation where the error has not occurred by the automatic restoration processing in step 903. If it is determined that the HDD 107 is restored (YES in step 904), the processing proceeds to step 902. In step 902, the CPU 109 performs the normal operation. On the other hand, if it is determined that the HDD 107 is not successfully restored (NO in step 904), the processing proceeds to step 905. In step 905, the CPU 109 initializes (formats) the HDD 107.

In step 906, the application presence/absence determination function 702 determines whether an application program, which has already been installed in the printing apparatus 100, exists.

If it is determined that the application program, which has already been installed, does not exist (NO in step 906), the processing proceeds to step 902. In step 902, the printing apparatus 100 performs the above-mentioned "HDD degeneration mode". If it is determined that the application program, which has already been installed, exists (YES in step 906), the processing proceeds to step 907.

In step 907, the security identification information determination function 704 determines whether the application program, which has already been installed, includes an application program having security identification information 403. If it is determined that the application program including the security identification information 403 does not exist (NO in step 907), the processing proceeds to step 908. If it is determined that the application program including the security identification information 403 exists (YES in step 907), the processing proceeds to step 910.

In step 908, the display function 706 displays on the operation unit 102 a warning message indicating that the application program stored in the HDD 107 has disappeared by the storage area initialization processing in step 905.

In step 909, the CPU 109 determines whether a predetermined operation by the user for releasing the warning message displayed in step 908 is performed. If the predetermined operation for releasing the warning message is performed (YES in step 909), the processing proceeds to step 902. In step 902, the printing apparatus 100 performs the above-mentioned "HDD degeneration mode". Otherwise (NO in step 909), the processing in step 909 is repeated.

In step 910, the application execution determination function 703 determines (1) whether the application program including the security identification information 403 is being executed or (2) whether the application program is to be executed at predetermined timing such as the start time of the printing apparatus 100.

If it is determined that the application program including the security identification information 403 is not being executed or that the application is not to be executed at predetermined timing such as the start time of the printing apparatus 100 (NO in step 910), the processing proceeds to step 908. On the other hand, if it is determined that the application program including the security identification information 403 is being executed or that the application program is to be executed at predetermined timing such as the start time of the printing apparatus 100 (YES in step 910), the processing proceeds to step 911.

In step 911, the CPU 109 displays an error message, similar to the processing in the "HDD error display mode" in step 607 illustrated in FIG. 6. The error message to be displayed is a message for prompting the user to call a service engineer and request the service engineer to perform predetermined restoration processing. If the processing in step 911 is executed, predetermined restoration processing is required to restore the printing apparatus 100. Further, while the processing in step 911 is being executed, the printing apparatus 100 does not enter an operating state, so that the printing function and the image processing function are not operable.

According to the flowchart illustrated in FIG. 9, if the application program including the security identification information 403 cannot be executed in steps 907, 910, and 911, the printing apparatus 100 is not made to operate even if the HDD 107 is restored. Thus, the printing apparatus 100 can be prevented from operating without executing the application program including the security identification information 403, i.e., the application program required to maintain security of the printing apparatus 100. Accordingly, the security of the printing apparatus 100 can be maintained.

If the application presence/absence determination function 302 determines that the application program, which has already been installed, exists (YES in step 906 in the flowchart illustrated in FIG. 9), the processing may proceed to step 911 without performing the determinations in steps 907 and

910. More specifically, if an error has occurred in the HDD 107 while an application program is installed in the printing apparatus 100 and the HDD 107 stores an application file, and the HDD 107 is initialized, the printing apparatus 100 is set to the "HDD error display mode". In this state, the printing apparatus 100 does not enter an operable status even if the printing apparatus 100 is restarted.

In addition, if it is determined that the application program including the security identification information 403 exists (YES in step 907 in the flowchart illustrated in FIG. 9), the processing may proceed to step 911 without performing the processing in step 910.

Aspects of the present invention can also be realized by a computer of a system or apparatus (or devices such as a CPU or a MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-113825 filed May 20, 2011, which is hereby incorporated by reference herein in its entirety.

What is claimed is:

1. An image processing apparatus comprising:
    a storage unit;
    a determination unit configured to determine whether a specific application is stored in the storage unit in a case where an error occurs in the storage unit; and
    a controlling unit configured to control the image processing apparatus to perform a degeneration operation for restricting usage of the storage unit in a case where the determination unit determines that the specific application is not stored in the storage unit, and control the image processing apparatus not to perform the degeneration operation in a case where the determination unit determines that the specific application is stored in the storage unit.

2. The image processing apparatus according to claim 1, wherein the specific application program is an application relating to a security function.

3. The image processing apparatus according to claim 2, wherein the application relating to the security function is an application relating to a user identification.

4. The image processing apparatus according to claim 2, wherein the application relating to the security function is an application for encrypting data stored in the storage unit.

5. A method for controlling an image processing apparatus including a storage unit, the method comprising:
    determining whether a specific application is stored in the storage unit in a case where an error occurs in the storage unit; and
    controlling the image processing apparatus to perform a degeneration operation for restricting usage of the storage unit in a case where the determination unit determines that the specific application is not stored in the storage unit, and control the image processing apparatus not to perform the degeneration operation in a case where the determination unit determines that the specific application is stored in the storage unit.

6. A non-transitory computer readable storage medium storing a program for executing a method for controlling an image processing apparatus including a storage unit, the method comprising:
    determining whether a specific application is stored in the storage unit in a case where an error occurs in the storage unit; and
    controlling the image processing apparatus to perform a degeneration operation for restricting usage of the storage unit in a case where the determination unit determines that the specific application is not stored in the storage unit, and control the image processing apparatus not to perform the degeneration operation in a case where the determination unit determines that the specific application is stored in the storage unit.

7. An image processing apparatus comprising:
    a storage unit;
    a printing unit configured to perform printing processing;
    a determination unit configured to determine whether a specific application is stored in the storage unit in a case where an error occurs in the storage unit; and
    a controlling unit configured to control the image processing apparatus to operate in a degeneration mode in which the printing processing is performable while usage of the storage unit is restricted, in a case where the determination unit determines that the specific application is not stored in the storage unit, and control the image processing apparatus to operate in an error mode in which the printing processing is not performable instead of the degeneration mode, in a case where the determination unit determines that the specific application is stored in the storage unit.

8. The image processing apparatus according to claim 7, wherein the specific application program is an application relating to a security function.

9. The image processing apparatus according to claim 8, wherein the application relating to the security function is an application relating to a user identification.

10. The image processing apparatus according to claim 8, wherein the application relating to the security function is an application for encrypting data stored in the storage unit.

11. The image processing apparatus according to claim 7, further comprising:
    a displaying unit configured to display a message for prompting a user to call an engineer in a case where the image processing apparatus operates in the error mode.

12. A method for controlling an image processing apparatus including a storage unit, the method comprising:
    performing printing processing;
    determining whether a specific application is stored in the storage unit in a case where an error occurs in the storage unit; and
    controlling the image processing apparatus to operate in a degeneration mode in which the printing processing is performable while usage of the storage unit is restricted, in a case where the determining determines that the specific application is not stored in the storage unit, and controlling the image processing apparatus to operate in an error mode in which the printing processing is not performable instead of the degeneration mode, in a case where the determining determines that the specific application is stored in the storage unit.

13. A non-transitory computer readable storage medium storing a program for executing a method for controlling an image processing apparatus including a storage unit, the method comprising:
performing printing processing;
determining whether a specific application is stored in the storage unit in a case where an error occurs in the storage unit; and
controlling the image processing apparatus to operate in a degeneration mode in which the printing processing is performable while usage of the storage unit is restricted, in a case where the determining determines that the specific application is not stored in the storage unit, and controlling the image processing apparatus to operate in an error mode in which the printing processing is not performable instead of the degeneration mode, in a case where the determining determines that the specific application is stored in the storage unit.

* * * * *